Oct. 15, 1935.  S. MARCUS  2,017,216
APPARATUS FOR PLASTIC MOLDING
Filed Aug. 14, 1930  2 Sheets-Sheet 1

INVENTOR
Samuel Marcus
BY
ATTORNEYS

Oct. 15, 1935.     S. MARCUS     2,017,216
APPARATUS FOR PLASTIC MOLDING
Filed Aug. 14, 1930     2 Sheets-Sheet 2
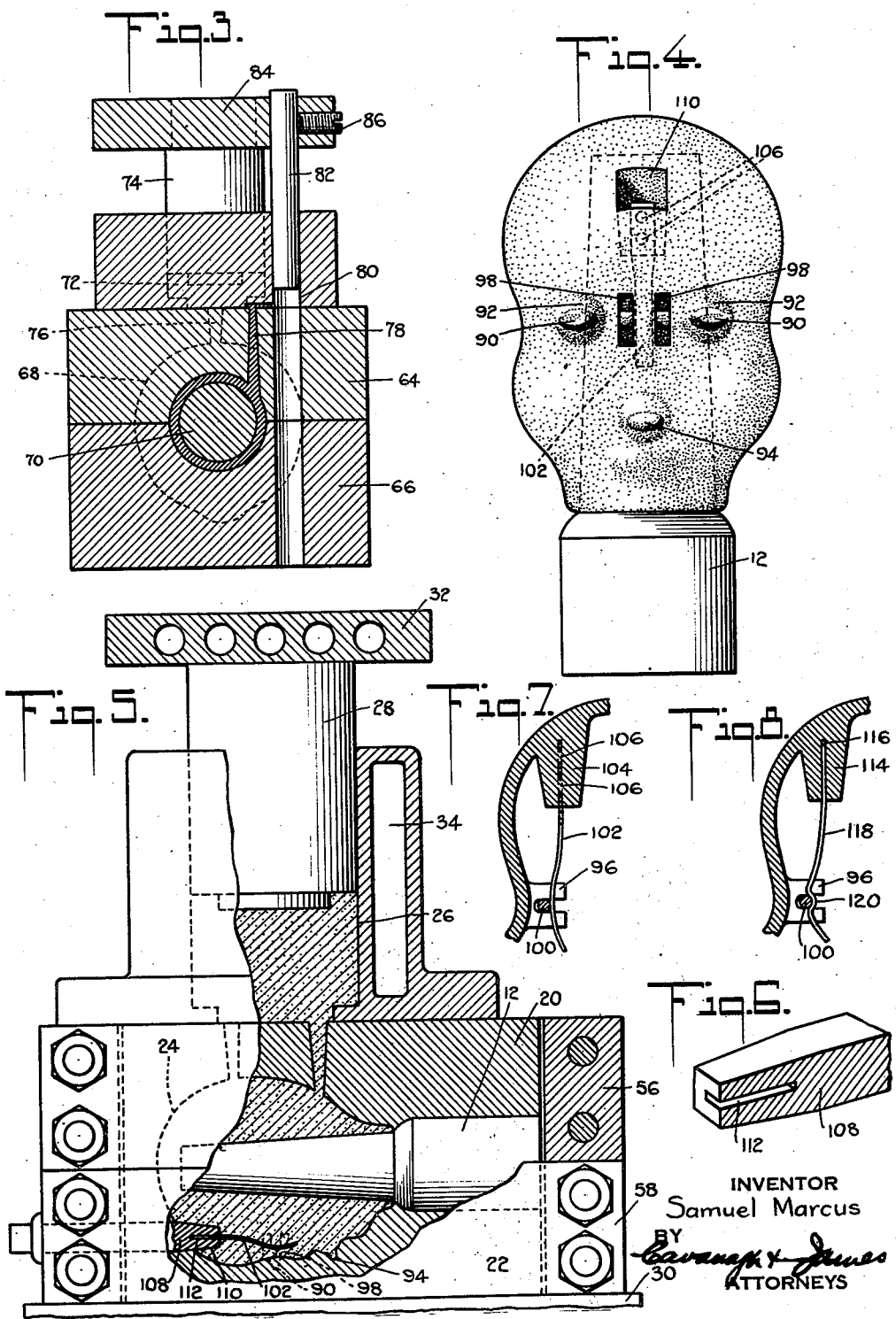
INVENTOR
Samuel Marcus
BY
Cavanagh & James
ATTORNEYS

Patented Oct. 15, 1935

2,017,216

UNITED STATES PATENT OFFICE

2,017,216

APPARATUS FOR PLASTIC MOLDING

Samuel Marcus, New York, N. Y., assignor, by mesne assignments, to Margon Corporation, New York, N. Y., a corporation of New York Application August 14, 1930, Serial No. 475,160

13 Claims. (Cl. 18—42)

This invention relates to plastic molding, and more particularly to means for molding hollow articles out of plastic material.

In molding hollow articles out of plastic compositions such as synthetic resins and, more particularly, phenolic condensation product, it has been customary to make the article out of separate portions which are subsequently adhered together by a suitable cement. This practice has obtained even when molding hollow articles which have an opening through which a core might be supported, whenever the opening was smaller than the interior of the hollow article, or for some other reason the core produced an undercut within the article. One primary object of the present invention is to devise a method, and apparatus for the practice of the method, which will make it possible to mold such hollow articles integrally, or out of a single body of material. This is done, generally, by making up the core out of a solid retractable portion surrounded by a portion which is readily broken down without injury to the molded composition, as by fusion, solution, or disintegration. After the plastic composition has been molded, the mold is opened, the molded article and core removed therefrom, and the retractable or solid portion of the core withdrawn, whereupon the remaining portion of the core may readily be broken down in order to remove the same from the molded article.

In molding synthetic resins and phenolic condensation products it has been the practice to place the material in the mold and to subsequently subject the material to heat and pressure in order to change it from a solid to a plastic and to conform it to the shape of the mold impression. This practice is satisfactory when molding a relatively solid article, but is unsatisfactory when attempting to mold an integral hollow article, inasmuch as the material must be distributed outside of the core entirely around the mold. Accordingly, a further primary object of the present invention resides in the provision of a method and means for facilitating the molding of a phenolic condensation product into an integral hollow article. This object is fulfilled, in general, by placing the material to be molded in a separate chamber which is in flow communication with the mold, and subjecting the material to heat and pressure in the said auxiliary chamber in order to force it into the mold and around the core in a plastic condition. In this condition the plastic material readily flows entirely around the mold, even though the space between the core and mold is relatively slight, in order to produce a thin-walled article.

The foregoing objects of the present invention are specifically applied, in the present case, to improvements in the manufacture of dolls' heads. Such heads are ordinarily made of wood pulp or like material impregnated with glue, and are assembled from separately molded front and rear halves. Considerable difficulty is encountered with such dolls' heads in producing the necessary mouth and eye openings, particularly the latter which must be located accurately and have an inside surface which will conform to the hemispherical configuration of the movable eyes subsequently inserted in the head. These eye openings are sometimes formed by punching, and sometimes are molded when molding the head, but in either case the openings must subsequently be finished by machine operations, and the inner surfaces thereof must be accurately frazed to obtain the desired hemispherical shape. Even with these precautions extreme difficulty is encountered because of subsequent warping and changes in shape of the head which move the eye openings out of alignment. Additional difficulty is encountered in mounting the movable eye set in the head, for special expansion bridges or similar mounting means are needed which may be expanded and embedded into the walls of the head in order to locate the eye set in proper location with the eye openings.

To overcome these difficulties it has been suggested to mold dolls' heads out of a phenolic condensation product in order that the necessary openings therein may be accurately molded to correct size and shape during the molding process itself. However, the front and rear halves of the heads must be adhered together, and regardless of the method employed for this step and of great care exercized in the operation, it is found that at a later time the heads split or crack and are therefore worthless. Another object of the present invention, therefore, relates to the molding of dolls' heads out of a single body of plastic material and more particularly out of a single body of phenolic condensation product, or, in other words, to the production of an integrally molded doll's head. To fulfil this object, the features of the invention previously outlined may readily be employed, the core being made of a solid and preferably cylindrical metallic portion which projects out of and is retractable through the neck opening of the doll's head, and a surrounding portion made of a material which is readily broken down without injury to the doll's head after the solid portion of the core is removed.

Further objects of the present invention center about the particular problem of producing such a doll's head, and are to form the mouth and eye openings accurately in place and to form supporting members on the interior of the doll's head for receiving and supporting a movable eye set and resiliently urging the same into contact with the eye openings in the head. For this purpose the core is provided with protuberances for directly and accurately forming the desired eye and mouth openings and may further be provided with recesses for directly and accurately forming mounting means for the eye set. If desired, resilient means for urging the eye set into contact with the eye openings may be molded directly into the doll's head.

Still another object of the present invention is to support the core accurately in position within the mold. It is readily appreciated that when dealing with a relatively large hollow article having thin walls, any movement of the core within the mold will lead to differences in wall thickness which may spoil the finished article. In accordance with further features of the present invention the solid portion of the core, which extends through the core and supports the same rigidly, is extended outside of the core at the neck opening, and this extension is clamped between the separable portions of the mold. If desired, the core may be additionally supported by means of the protuberances thereon which form the mouth and eye openings in the head, and it may be remarked that for this reason the head is preferably molded face downward.

Other objects of the invention relate to the core employed in the molding process.

To the accomplishment of the foregoing and such other objects as will hereinafter appear, my invention consists in the method steps and apparatus elements and their relation one to the other as hereinafter are more particularly described in the specification and sought to be defined in the claims. The specification is accompanied by drawings in which:

Fig. 3 is a transverse section through a modified form of molding apparatus;

Fig. 4 is a front elevation of a core constructed in accordance with the present invention;

Fig. 5 is a partially sectioned elevation of apparatus for molding the core;

Fig. 6 is a detail thereof;

Fig. 7 is a section through the upper front portion of a doll's head showing eye set supporting means; and Fig. 8 is a similar view of a modification.

Figure 1:
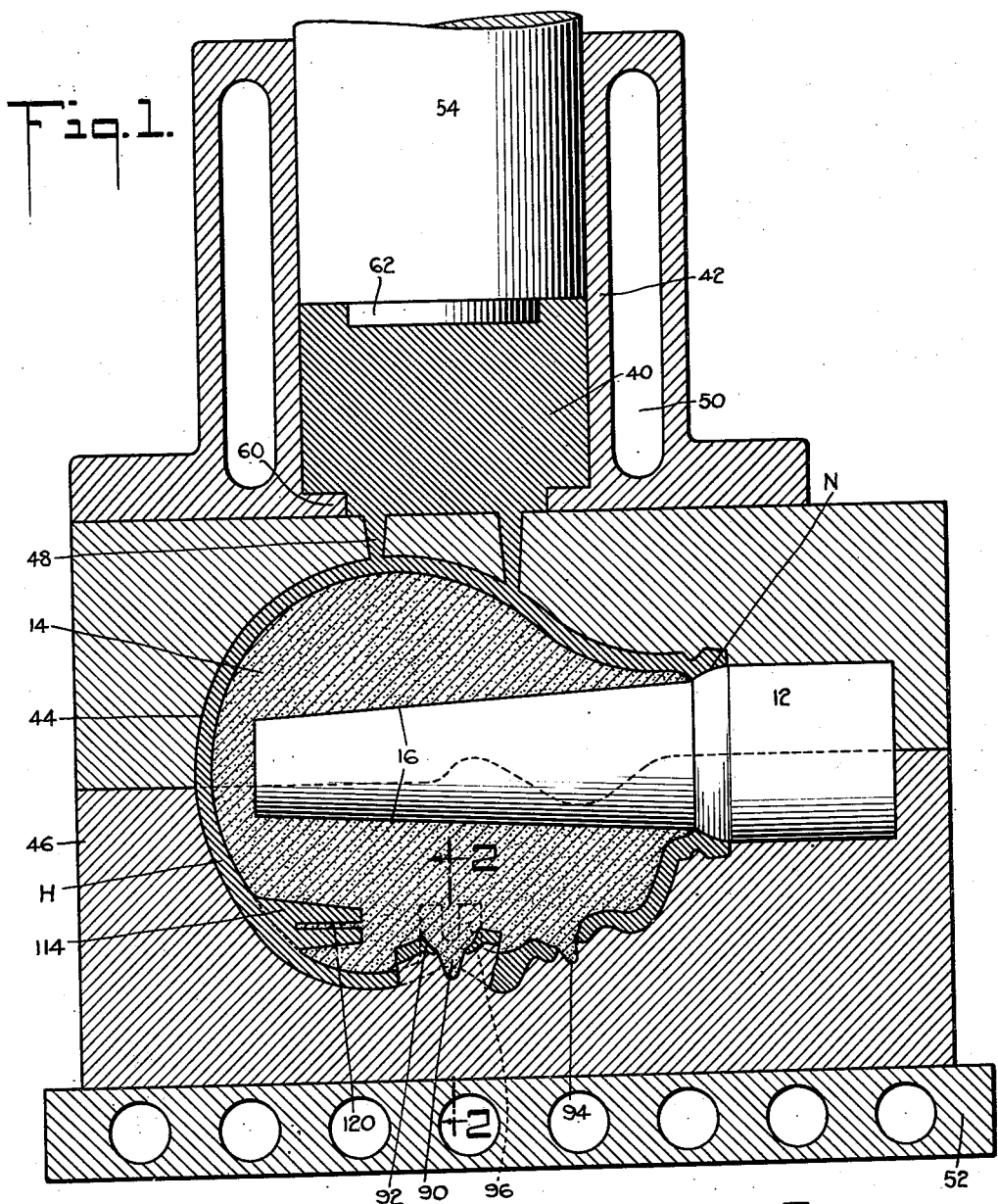
Fig. 1 is a section through apparatus for molding a doll's head.

Referring to the drawings and more particularly to Fig. 1 thereof, the present invention in one aspect centers about the molding of hollow articles such as the doll's head H in which there is an opening, such as the neck opening N through which a core may be supported, but which opening is smaller than the interior of the article, thereby preventing removal of the core. In accordance with the present invention the core is made of a solid retractable portion 12 surrounded by a portion 14 which is made of a material which is readily broken down without injury to the molded composition H. The retractable portion 12 is preferably a rigid metallic cylinder and may, if desired, be tapered, as at 16, in order to facilitate removal of the same from the remainder of the core. The surrounding portion 14 may be made in a number of ways. It may be disintegrable and may, for instance, be made of sand impregnated with an adhesive or binding material, and in such case disintegration and removal of the core is greatly facilitated by preliminary removal of the retractable portion 12. The surrounding portion may be soluble and made, for example, of salt or a similar composition which, after the retractable portion 12 has been removed, may readily be dissolved or washed out of the molded head without injury to the composition of the head. The surrounding portion may be made readily fusible so that by heating the molded head after removing the retractable portion 12, the remainder of the core may be molten and permitted to run out of the neck opening of the head. The fusion temperature should, of course, be lower than that which will injure the composition from which the head is molded. A metal having a low melting temperature may be employed. Shellac may be used which, while having a lower fusing point than the reaction temperature of typical phenolic condensation products is, nevertheless, not fused during the molding process because of the time factor of this material which prevents it from fusing quickly enough to be injured during the molding of the head. Other plastics are known which may be molded under heat and pressure to form the core, and which may be again melted and removed at a temperature which is higher than the reaction temperature, but not sufficiently high to injure previously set phenolic condensation product. Such material, after being removed from the doll's head, may be used over again any desired number of times.

When making the core out of a fusible material it may be molded in the manner illustrated in Fig. 5, in which the retractable portion 12 is clamped between the upper and lower halves 20 and 22 of a mold, the impression 24 in which corresponds to the desired shape of the inside of the doll's head. The material for the core may be placed in a cylinder 26 from which it may be forced by a piston 28 into the mold impression 24. The mold, the piston, and the cylinder may respectively be heated by steam platens 30 and 32 and a steam jacket 34. By separating the upper and lower mold impressions 20 and 22 the compound core may be removed, it then having the general appearance indicated in Fig. 4.

Considered in another aspect, the present invention involves the molding of relatively thin hollow articles out of Durez, bakelite or similar phenolic condensation product. Such products are usually molded by placing the material in the mold and then subjecting the same to heat and pressure in order to make it plastic and to mold it to the desired shape. This method is suitable when molding solid articles, or when molding thin-walled articles in a relatively open mold such as would be used when molding halves of a doll's head, but is unsatisfactory when attempting to mold a doll's head integrally, because the material must be successfully distributed entirely around the inside of the mold impression in the narrow space left between the core and the mold impression. In accordance with the present invention a body of the phenolic condensation product 40 (see Fig. 1) is placed in an auxiliary or pressure chamber 42 which is in flow communication with the mold impression 44 in a mold 46 by means of one or more gates 48. The core 14 is supported within the mold impression 44 by means of the retractable portion 12 which is clamped between the separable halves of the mold. The material 40 is subjected to heat by means of a steam jacket 50 or other appropriate heating means, and the mold 46 may likewise be heated by means of a steam platen 52. The phenolic condensation product is simultaneously subjected to a high pressure by means of a piston 54 reciprocable in cylinder 42. This piston may be heated by appropriate means, being, for example, mounted on a movable steam platen, not shown, similar to the platen 32 in Fig. 5. The heat and pressure reduce the phenolic condensation product to a fluid or pasty state, and under the high pressure it is caused to flow into the mold and around the core until the head is accurately shaped.

The molding pressure may be very high, say of the order of two thousand pounds per square inch, and it is therefore desirable to equip the mold with steel bumper frames or blocks such as the frames 56 and 58 indicated in Fig. 5. These frames have been omitted from the remaining drawings in order not to complicate the same.

In order to hold the cylinder 42 tightly against the upper portion of the mold 46 without necessitating special clamping means, a portion of the high pressure applied to the piston 54 may be utilized. This is most simply done by reducing the area of the opening at the bottom of cylinder 42, as is indicated by the annular projection 60. The pressure of the plastic composition against this annular projection serves to clamp the cylinder tightly against the mold. In order to insure complete extrusion or discharge of the plastic material from the cylinder into the mold, the bottom of the piston may be provided with a projection of reduced diameter 62, which is adapted to pass the stepped portion or annular projection 60 of the cylinder.

During the molding process air is forced out of the mold. In the form of the invention shown in Fig. 1, this air is permitted to escape between the upper and lower portions of the mold, even though the latter are tightly clamped together, for slight imperfections in the parting faces of the mold always exist. In Fig. 3 I have illustrated a modification in which special provision is made for venting the mold. This view is a section taken in elevation and looking transversely of the direction of the section shown in Fig. 1. The mold comprises upper and lower portions 64 and 66 in which there is a mold impression 68 corresponding to the shape of the doll's head. The neck portion of the core is indicated at 70. The composition to be molded is forced into the mold from a cylinder 72 in which a piston 74 reciprocates. In addition to a gate 76 connecting the cylinder 72 and the mold impression, the mold impression is provided with a riser or vent 78 terminating in a cylinder 80. A rod or plunger 82 is arranged to reciprocate in the cylinder 80 and serves to cut off the vent opening 78. The plunger 82 is moved with the pressure piston 74 by means of a platen 84. The plunger 82 is adjustably mounted in the platen 84 by means of a lock screw 86, so that the time of the cut off of the vent 78 relative to the stroke of piston 74 may be properly adjusted to obtain the desired venting action.

The particular form of hollow article here dealt with is a doll's head, and it has already been explained that it is especially advantageous to mold such a doll's head out of Durez, Bakelite, or like phenolic condensation product when the head is to be provided with movable eyes, in order that the eye openings may be molded directly in the doll's head when the head is made, without necessitating frazing operations, and in order to prevent disalignment of the eye openings due to warping of the head and so on. To provide the desired eye openings it is merely necessary to make the core 14 include protuberances such as the protuberances numbered 90 in Figs. 1, 2, 4, and 5. The section in Fig. 1 is staggered from the center of the head to one of the eye openings in order to more clearly show the protuberances 90. The portion 92 of the protuberances 90 at the doll's head correspond to the surface of a hemisphere in order to provide hemispherical seats at the eye openings in which the hemispherical eye shells will accurately fit and rotate.

If additional openings are desired in the doll's head, as, for example, a mouth opening, the additional protuberance 94 may be provided which results in the formation of a mouth opening, just as the protuberances 90 result in the formation of eye openings. It will readily be understood that the protuberances 90 and 94 may be used to help support the core and accurately locate the same within the mold impression, and for this reason the head is preferably molded face downward so that the core may be carefully set into the lower portion of the mold, and in order to help support the core against the pressure of the plastic material forced into the mold from the cylinder above. It should further be understood that metallic inserts may be provided in the destructible portion 14 of the core for forming the eye and mouth openings, that is, the core, if desired, instead of comprising simply two portions, the indestructible portion 12 and the destructible portion 14, may comprise indestructible portions 12, 90, and 94 held in proper relation by the destructible portion 14. This, however, increases the expense of manufacturing the core and is a refinement which is not recommended.

Figure 2:
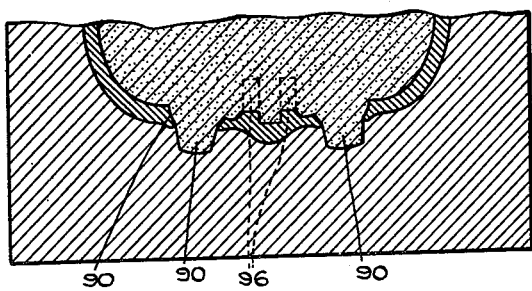
Fig. 2 is a section taken in the plane of the line 2—2 in Fig. 1.

Another advantage of molding the doll's head out of Bakelite or similar substance resides in the fact that the head may be provided with suitable projections or mounting means at the inside thereof in which an eye set of simple form comprising, for example, only a cross rod, a pair of eyes, and a pendant weight may be supported and resiliently urged into contact with the eye openings. In the present case bifurcated or U-shaped projections are provided between the eye openings, in which the cross rod of an eye set may be supported. Such a U-shaped supporting member is indicated at 96 in Fig. 1, and two of these are preferably provided located at the bridge of the nose between the eye openings, as is best shown in Fig. 2. To form these supports the core is provided with U-shaped recesses 98 best shown in Figs. 4 and 5.

Not only the eye set supporting means 96, but also a mounting for supporting resilient means for urging the eye set into intimate contact with the eye openings may, if desired, be molded integrally with the doll's head. To best understand this feature of the invention, attention is first directed to Fig. 7 which is a fragmentary section through a doll's head showing how the cross rod 100 of an eye set may be retained in the eye set supporting means 96 by a spring 102 the upper end of which is embedded directly in a mounting block 104 molded on the interior of the doll's head. The spring 102 is provided with apertures 106 through which the plastic material spreads when the head is being molded, thereby strengthening the anchorage of the spring 102 in the head.

The manner in which the spring 102 may be thus embedded in the doll's head is illustrated in Figs. 4 and 5. In Fig. 5 it will be observed that a retractable core 108 is provided in the lower half of the mold 22. The end of core 108 is shown in sectioned perspective in Fig. 6 and corresponds in shape to the block or mounting 104 in Fig. 7, and forms a recess 110 in the core, best shown in Fig. 4, which subsequently is filled with the plastic material when the head is molded, thereby forming the desired block or mounting 104. The end of core 108 is provided with a slot 112 into which the perforated end of spring 102 may be inserted. The spring is so positioned that it is excessively near the front of the doll's head. The material for the core is then forced into the mold and surrounds not only the retractable portion 12 of the core, but also the body of the spring 102 except for the end carried in the slot 112. The core 108 is retracted before the core of the doll's head is removed from the mold, after which the core appears as in Fig. 4, with the spring 102 embedded therein except for the upper end thereof which projects into the recess 110. It will be evident that when the core shown in Fig. 4 is placed in a mold and the mold filled with composition, the composition will be forced into the recess 110 and around the end of spring 102, thereby anchoring it in place in the manner indicated in Fig. 7. When the core is broken down and removed from the doll's head, the body of the spring will be left in place, and when forced backward by the presence of an eye set, which may be inserted through the neck opening of the doll's head, the spring will possess the proper resiliency to urge the eye set into contact with the eye openings in the doll's head.

If desired, the spring may be mounted in place and may be inserted in the doll's head after the head has been molded. Such an arrangement is illustrated in Fig. 8 in which the block or mounting 114 contains a slot 116 in which the end of a spring 118 may be inserted. The lower end of the spring is corrugated at 120 to partially surround the cross rod of the eye set, thereby helping hold the spring in place. For this mounting it is merely necessary that the block 114 be provided with a slot 116 for receiving the end of the spring. This may readily be accomplished by providing the core 108, illustrated in Figs. 5 and 6, with a slot 112 preferably somewhat larger than that previously mentioned, so that the core when molded will include a projection 126, best shown in Fig. 1, around which the composition will flow, and which will cause a slot to remain in the block 114. It will be understood that here as in the case of the eye and mouth protuberances 90 and 94, a metal insert may be provided in the core, corresponding closely to the spring 102 described in connection with Fig. 5, with the important difference, of course, that the insert would not be provided with apertures and would not be permanently held in the block 114, as is the case with the spring 102 in the block 104.

The mode in which the method of the invention may be practiced, and the construction of suitable apparatus for the practice of the method, as well as the many advantages thereof will, it is thought, be apparent from the foregoing description. Hollow articles may be molded in one piece instead of several parts which must subsequently be joined. Compositions such as Durex, Bakelite, or like phenolic condensation products may be successfully molded, even though the article is a relatively thin-walled hollow article. The invention as applied to a doll's head produces a head which is strong, durable, and capable of receiving attractive finishes. The head may be provided with eye openings and mouth openings during the molding thereof, and the eye openings may be accurately located and provided with true hemispherical seats without subsequent frazing operations. The head is not subject to warping and changes in shape. It may have integrally molded therewith supporting means for an eye set and a mounting for resilient means for urging the eye set into contact with the eye openings, and, if desired, the resilient means may be molded directly in the head. The core may be rigidly and accurately supported within the mold by reason of the strong central retractable portion thereof, and the support may be further strengthened by utilizing the necessary protuberances on the core for the mouth and eye openings. When the retractable portion of the core is withdrawn, the remainder of the core may readily be broken down and removed from the head, and the material thereof may be employed repeatedly. The cores are readily molded by a process quite similar to that employed for the molding of the doll's head itself.

It will be apparent that while I have shown and described my invention in the preferred forms, many changes and modifications may be made in the methods and structures described without departing from the spirit of the invention, defined in the following claims.

I claim:

1. Apparatus for the manufacture of one-piece dolls' heads out of a moldable composition, comprising separable mold portions with a mold impression having the shape of a doll's head, a core comprising an indestructible rigid retractable portion and a destructible surrounding portion made of a material which may be readily broken down without injury to the molded composition, said surrounding portion having the shape of the interior of the doll's head and including protuberances for directly and accurately forming the eye openings in the doll's head, said retractable portion extending out of the body of the core at the neck opening of the doll's head and being tightly clamped between the separable portions of the mold, the aforesaid protuberances on the core further serving to support and locate the core in the mold.

2. Apparatus for the manufacture of one-piece dolls' heads out of a moldable composition, comprising separable mold portions with a mold impression having the shape of a doll's head, a core comprising an indestructible rigid retractable portion and a destructible surrounding portion made of a material which may be readily broken down without injury to the molded composition, said surrounding portion having the shape of the interior of the doll's head and including protuberances for directly and accurately forming the eye and mouth openings in the doll's head and further including recesses for forming eye set supporting protuberances on the interior of the doll's head, said retractable portion extending out of the body of the core at the neck opening of the doll's head and being clamped between the separable portions of the mold in order to support the core in the mold, the aforesaid protuberances on the core further serving to support and locate the core in the mold.

3. Apparatus for the manufacture of dolls' heads out of a single body of permanently infusibly thermosetting resinous material, comprising separable mold portions with a mold impression having the shape of a doll's head, a core including an indestructible retractable portion and a surrounding destructible portion made of a material which may readily be broken down without injury to the resinous material when the latter has set, said surrounding portion having the shape of the interior of the doll's head and including protuberances for directly and accurately forming the eye and mouth openings in the doll's head and further including recesses for forming eye set supporting protuberances on the interior of the doll's head, said retractable portion extending out of the body of the core at the neck opening of the doll's head and being clamped between the separable portions of the mold in order to support the core in the mold, a pressure chamber in flow communication with the mold through a constricted passage, means to heat the pressure chamber, and a piston reciprocable in the pressure chamber for forcing the resinous material in a free flowing condition under heat and pressure from the pressure chamber into the mold, whereby the material may distribute itself around the destructible core to form the walls of the doll without meanwhile injuring the destructible core.

4. Apparatus for the manufacture of one-piece dolls' heads out of a moldable composition, comprising separable mold portions with a mold impression having the shape of a doll's head, a core comprising an indestructible rigid retractable portion and a destructible surrounding portion made of a fusible material which may be readily fused without injury to the molded composition, said surrounding portion having the shape of the interior to the doll's head and including protuberances for directly and accurately forming the eye openings in the doll's head, said retractable portion extending out of the body of the core at the neck opening of the doll's head and being clamped between the separable portions of the mold in order to support the core in the mold, the aforesaid protuberances on the core further serving to support and locate the core in the mold.

5. Apparatus for the manufacture of one-piece dolls' heads out of a moldable composition, comprising separable mold portions with a mold impression having the shape of a doll's head, a core comprising an indestructible rigid retractable portion and a destructible surrounding portion made of a fusible material which may be readily fused without injury to the molded composition, said surrounding portion having the shape of the interior of the doll's head and including protuberances for directly and accurately forming the eye and mouth openings in the doll's head and further including recesses for forming eye set supporting protuberances on the interior of the doll's head, said retractable portion extending out of the body of the core at the neck opening of the doll's head and being clamped between the separable portions of the mold in order to support the core in the mold, the aforesaid protuberances on the core further serving to support and locate the core in the mold.

6. Apparatus for the manufacture of dolls' heads out of a single body of synthetic resinous material, comprising separable mold portions with a mold impression having the shape of a doll's head, a core including an indestructible retractable portion and a surrounding destructible portion made of a fusible material which may readily be fused without injury to the resinous material when the latter has set, said surrounding portion having the shape of the interior of the doll's head and including protuberances for directly and accurately forming the eye and mouth openings in the doll's head and further including recesses for forming eye set supporting protuberances on the interior of the doll's head, said retractable portion extending out of the body of the core at the neck opening of the doll's head and being clamped between the separable portions of the mold in order to support the core in the mold, a pressure chamber in flow communication with the mold through a constricted passage, means to heat the pressure chamber and the mold, and a piston reciprocable in the pressure chamber for forcing the resinous material in a free flowing condition under heat and pressure from the pressure chamber into the mold, whereby the material may distribute itself around the destructible core to form the walls of the doll without meanwhile injuring the destructible core.

7. Apparatus for the molding of hollow articles out of permanently infusibly thermosetting resinous material, comprising separable mold portions, a destructible core at least partially made of material which is readily broken down without injury to the resinous material when the latter has set, a pressure chamber in flow communication with the mold through a constricted passage, means to heat said pressure chamber, a plunger movable to force the resinous material in a free flowing condition under heat and pressure from the pressure chamber into the mold, a vent passage leading from the mold chamber, and means movable in response to movement of said plunger to close said vent passage after the mold has been substantially filled.

8. Molding apparatus comprising separable mold portions, a pressure chamber in flow communication with the mold through a constricted passage, a plunger movable to force molding material from the pressure chamber into the mold, a vent passage leading from the mold, means movable with the plunger to cut off said vent passage, and means to adjust the time of cut-off.

9. Apparatus for the manufacture of one-piece dolls' heads out of a moldable composition, comprising separable mold portions with a mold impression having the shape of a doll's head, a core including an indestructible rigid retractable portion and a destructible surrounding portion made of a material which may be readily broken down without injury to the molded composition, said surrounding portion having the shape of the interior of the doll's head, and said retractable portion extending out of the body of the core at the neck opening of the doll's head and being clamped between the separable portions of the mold, a pressure chamber in flow communication with the mold through a constricted passage, a plunger movable in the pressure chamber to force the material in a free flowing condition from the pressure chamber into the mold, a vent passage leading from the mold, and means movable with the plunger to cut off said vent passage.

10. Apparatus for the manufacture of one-piece dolls' heads out of a moldable composition, comprising separable mold portions with a mold impression having the shape of a doll's head, a core including an indestructible rigid retractable portion and a destructible surrounding portion made of a material which may be readily broken down without injury to the molded composition, said surrounding portion having generally the shape of the interior of the doll's head and including appropriate recesses for forming eye set mounting means on the interior of the head, said mounting means including at least two separate portions, one to support an eye set, and the other to support resilient means for retaining the eye set in the eye set support means.

11. Apparatus for the manufacture of one-piece dolls' heads out of a moldable composition, comprising separable mold portions with a mold impression having the shape of a doll's head, a core including an indestructible rigid retractable portion and a destructible surrounding portion made of a material which may be readily broken down without injury to the molded composition, said surrounding portion having the shape of the interior of the doll's head, said retractable portion extending out of the body of the core at the neck opening of the doll's head and being clamped between the separable portions of the mold, said destructible portion including means to form eye set support means on the interior of the head and further including resilient means adapted to be molded in place in a part of the head and intended for cooperation with the mounting means to hold an eye set in place thereon.

12. Apparatus for the manufacture of a doll's head out of a moldable composition, comprising a mold dimensioned to form a front head wall therein, said mold including recesses for forming eye set supporting means and additional supporting means spaced from said eye set supporting means and adapted to receive resilient means for holding an eye set in place on said eye set supporting means.

13. Apparatus for the manufacture of a doll's head, comprising separable mold portions with a mold impression having the shape of a doll's head, a core including an indestructible retractable portion and a surrounding destructible portion made of a material which may readily be broken down without injury to the molding material when the latter has set, said surrounding portion having the shape of the interior of the doll's head, said retractable portion extending out of the body of the core at the neck opening of the doll's head and being clamped between the separable portions of the mold, said destructible portion including appropriate recesses for forming eye set supporting means and additional supporting means for receiving resilient means for holding an eye set on said eye set supporting means, a pressure chamber in flow communication with the mold through a constricted passage, means to heat the pressure chamber, and a piston reciprocable in the pressure chamber for forcing the molding material in a free flowing condition under heat and pressure from the pressure chamber into the mold.

SAMUEL MARCUS.